H. L. FERRIS.
CATTLE WATERING DEVICE.
APPLICATION FILED JUNE 13, 1914.

1,160,588.

Patented Nov. 16, 1915.

Witnesses:

Inventor
Henry L. Ferris,
By Dyrenforth, Lee, Chritton & Wiles,
Attys.

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

CATTLE-WATERING DEVICE.

1,160,588.  Specification of Letters Patent.  Patented Nov. 16, 1915.

Application filed June 13, 1914. Serial No. 844,884.

*To all whom it may concern:*

Be it known that I, HENRY L. FERRIS, a citizen of the United States, residing at Harvard, in the county of McHenry and State of Illinois, have invented a new and useful Improvement in Cattle-Watering Devices, of which the following is a specification.

My invention relates to certain new and useful improvements in cattle watering devices, and is fully described and explained in the specification and shown in the accompanying drawings, in which:—

Figure 1:
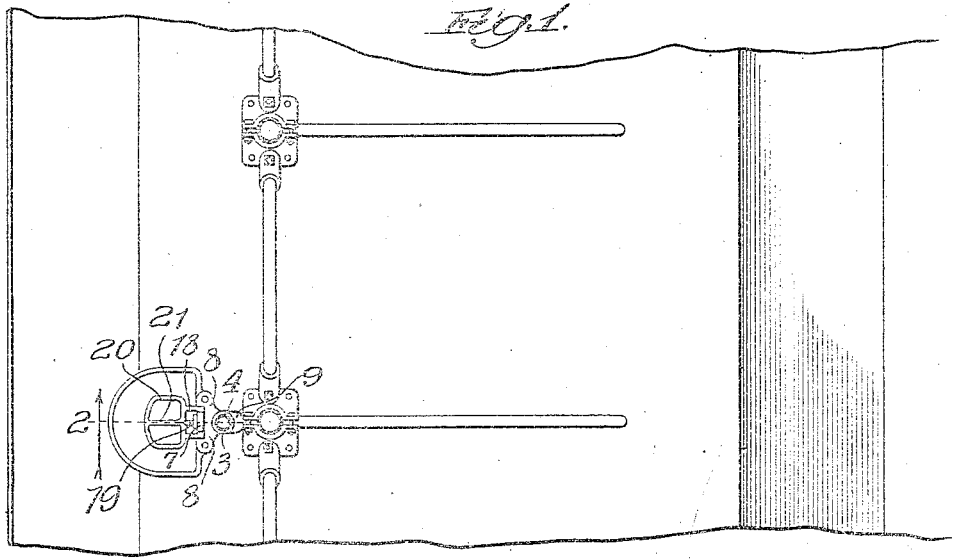
Figure 2:
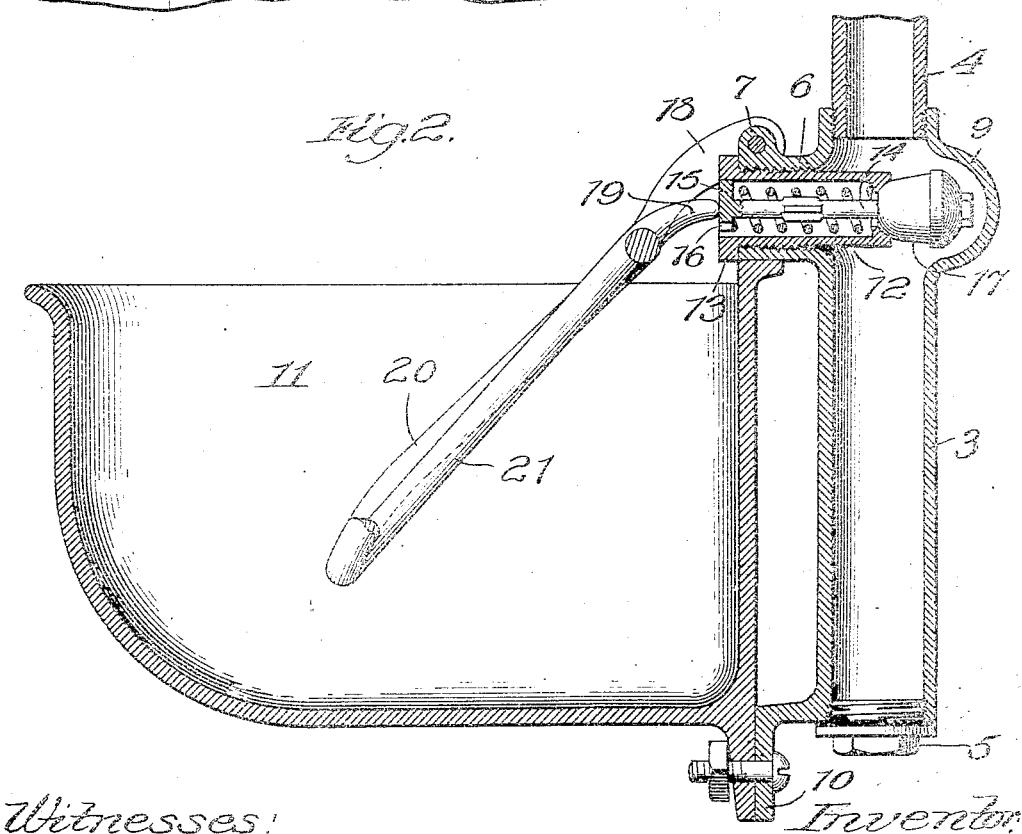

Figure 1 is a top plan of my improved device showing the relation which the same normally bears to a cattle stall, and Fig. 2 is a section on the line 2 of Fig. 1, showing the construction in detail.

Referring to the drawings, 3 is a vertical pipe screw-threaded at its top and bottom. In the arrangement shown the top of the tube 3 receives the water-pipe 4 and the bottom is closed by a plug 5. This arrangement, however, may be reversed, and the structure is designed particularly to the end that the supply of water may be let in from the top or the bottom, in accordance with the requirement and convenience in arranging the pipe. Projecting laterally from the pipe 3 is an integral boss 6 interiorly threaded, provided on its top with a perforated ear 7 and with laterally extending ears 8. Diametrically opposite to the boss 6 is a protuberance 9 to afford space for the valve-mechanism shown and which will be presently described. At the bottom of the water-pipe 3 is an integral ear 10.

11 is a bowl from which the cattle drink and it is held in position by being bolted to the ears 8 and 10 which are integral with the pipe 3.

The structure as thus far described, while it may be placed in any position accessible to the cattle will, in the majority of cases, be placed over the feed-trough on the line between two stalls, as shown in Fig. 1. The cattle drinking from it when in such position will be held by the stanchions and will, therefore, have to reach into the bowl from the side. The structure for admitting water has been designed with special reference to the position from which the cattle necessarily reach it, and is such as to give the greatest possible efficiency under the conditions stated, which are those most frequently occurring.

Threaded in the boss 6 is a thimble 12 provided with a head 13 shaped to be engaged by a wrench whereby to turn the thimble in or out. Within the thimble is a valve-stem 14 terminating in a head 15 which guides the same in the thimble and is notched at 16 to permit water to flow past it. On the opposite end of the stem 14 is a valve-head 17, preferably of rubber, which seats in the end of the thimble to close it. Pivoted to the ear 7 is a valve-operating member. This is made in one integral piece and comprises arms 18 which afford pivotal engagement with the ear 7, a finger 19 to engage the valve-stem to open the valve, and an annular frame 20 intersected by a bar 21 so as to afford a widely reticulated member of considerable area. The valve-operating member is so pivoted as to slant downwardly into the bowl occupying the position shown in Fig. 2 when the valve is closed. Its angular position can be adjusted, when necessary, by turning the thimble in or out of the boss 6.

The present structure possesses a number of advantages over those heretofore used for the same purpose. From the point of view of mechanical conveniece, the valve-operating member can be adjusted with the utmost facility. In devices of the same general character, extensive mechanical work has been required to adjust the angular position of this part. With the present device it is only to be turned up and the thimble 12 screwed in or out the proper distance. This can be done without turning off the water supply or disassembling the structure in any way. But the great practical advantage of the present structure arises from the ease with which cattle can be accustomed to its use.

In the present device the valve-operating member is widely reticulated, being practically a grid-iron structure. The water in the bottom of the bowl is thus in plain view of the animal which is about to drink and in attempting to reach it, with its head entering from the side, the downwardly-inclined valve-operating member strikes the side of the jaw so as not to interfere with drinking at all. Thus, in reaching for the water the animal simply crowds the valve-operating member to one side, the movement being a perfectly natural one. As a result it is found in practice that a watering device, similar to that herein shown, can be installed for the use of a herd which has never seen it before and that without any effort whatever on the part of the farmer to accustom them to the use of the structure, they will all secure their drinking water from it without any difficulty. Whereas, with devices which appear to have considerable superficial resemblance to the present structure, the cattle have to be carefully trained or in the alternative they will fail to get their water.

I am aware that it has heretofore been proposed to use valve-actuating plates containing perforations, but these seem to have been employed without the purpose or result of the present construction. The principle here involved is to construct a valve-operating member consisting of bars spaced apart so that a substantially unobstructed view of the bottom of the bowl and the water therein is given to the cattle and this plate should, preferably, depend from one margin of the bowl at a relatively steep angle so as to contact with the side of the animal's muzzle rather than the end thereof.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:—

1. A device of the character described comprising a vertically extending water-pipe adapted to be connected at either of its ends with a source of supply, a bowl carried by the water-pipe and mounted exteriorly thereof, means on the water-pipe for supporting the bowl thereon, a water-way from the interior of the pipe adapted to deliver water into the bowl, a valve in said water-way, and a valve operating member extending from the water-way into the bowl and so positioned as to engage the muzzle of an animal drinking from the bowl.

2. A device of the character described comprising a water-pipe provided with a boss, a thimble entering the boss, a valve in the thimble, a bowl carried by the water-pipe, a valve operating member pivoted to the boss and formed of spaced bars, said member depending downward from the boss into the bowl at a sharp angle and being provided with a finger to engage the valve.

3. A device of the character described comprising a water-pipe having a laterally extending boss, a thimble adjustable in the boss, a valve in the thimble, a bowl, a valve-operating member pivoted to the boss and extending into the bowl and provided with a finger engaging the valve whereby the position of the valve-operating member can be varied by adjusting the thimble in its boss.

In testimony whereof I have hereunto set my hand this 1st day of June, 1914.

HENRY L. FERRIS.

In presence of two subscribing witnesses:
W. J. DELSROAT,
L. A. WHITE.